United States Patent [19]

Warner et al.

[11] Patent Number: 5,024,279

[45] Date of Patent: Jun. 18, 1991

[54] FOLDABLE IMPLEMENT CARRIER

[75] Inventors: Steven D. Warner, Naperville; John F. Stufflebeam, Romeoville, both of Ill.

[73] Assignee: J.I. Case Corporation, Racine, Wis.

[21] Appl. No.: 481,271

[22] Filed: Feb. 20, 1990

[51] Int. Cl.⁵ ............................................ A01B 73/06
[52] U.S. Cl. .................................... 172/1; 172/134; 172/311; 172/456
[58] Field of Search ............... 172/134, 311, 421, 456, 172/457, 458, 459; 111/53, 54, 57, 58

[56] References Cited

U.S. PATENT DOCUMENTS

| | | |
|---|---|---|
| 2,458,091 | 1/1949 | Moore . |
| 2,558,352 | 6/1951 | Gandrud . |
| 2,580,100 | 12/1951 | Johansen et al. . |
| 2,581,662 | 1/1952 | Hutchinson . |
| 2,691,931 | 10/1954 | Wilson . |
| 2,759,637 | 8/1956 | Gandrud . |
| 2,798,767 | 7/1957 | Andrews . |
| 2,901,268 | 8/1959 | Christensen . |
| 2,929,634 | 3/1960 | Gandrud . |
| 2,944,615 | 7/1960 | Clark . |
| 2,958,383 | 11/1960 | Danielson . |
| 2,973,818 | 3/1961 | Marvin . |
| 3,014,539 | 12/1961 | Ward . |
| 3,222,032 | 12/1965 | Schneider . |
| 3,360,053 | 12/1967 | Doepker . |
| 3,428,333 | 2/1969 | Nelson . |
| 3,491,836 | 1/1970 | Doepker . |
| 3,493,246 | 2/1970 | Tasset et al. . |
| 3,493,247 | 2/1970 | Tasset et al. . |
| 3,521,905 | 7/1970 | Tasset et al. . |
| 3,523,699 | 8/1970 | Sinkule et al. . |
| 3,548,954 | 12/1970 | Lindemann . |
| 3,564,934 | 2/1971 | McMurtry . |
| 3,606,848 | 9/1971 | Dobbs et al. . |
| 3,637,028 | 1/1972 | Fueslein et al. . |
| 3,654,999 | 4/1972 | Fischer . |
| 3,667,631 | 6/1972 | Bishop . |
| 3,680,648 | 8/1972 | Tonsfeldt . |
| 3,698,488 | 10/1972 | Yoder et al. . |
| 3,700,040 | 10/1972 | Sosalla et al. . |
| 3,705,560 | 12/1972 | Lappin . |
| 3,736,735 | 6/1973 | Kulak et al. . |
| 3,785,441 | 1/1974 | Sosalia . |
| 3,791,673 | 2/1974 | Hornung . |
| 3,828,860 | 8/1974 | Poland . |
| 3,912,017 | 10/1975 | Rehn . |
| 3,935,696 | 2/1976 | Pavel . |
| 3,941,194 | 3/1976 | Orthman . |
| 3,944,001 | 3/1976 | Warner et al. . |
| 3,948,326 | 4/1976 | Harbert . |
| 3,960,221 | 6/1976 | Blair et al. . |
| 3,982,773 | 9/1976 | Stufflebeam et al. . |

(List continued on next page.)

OTHER PUBLICATIONS

"Track Eradicator", Article in Farm Show, The Best of, 1990 Edition, Received in USPTO 12-22-89.

Primary Examiner—Dennis L. Taylor
Assistant Examiner—Jeffrey L. Thompson
Attorney, Agent, or Firm—Dykema Gossett

[57] ABSTRACT

A foldable implement carrier is disclosed including a central support bar supporting two pivotally connected tool bar sections which are movable from a laterally extended position to a folded position to reduce the width of the foldable implement carrier for transport. The tool bar sections have pivot columns which are rotationally received within a H-shaped frame member. A main wheel set is privotally connected to a frame, which includes the H-shaped member and the central support member, and is driven vertically downwardly to raise the frame off of the ground. The first and second tool bar sections are driven to pivot within the H-shaped frame member and move from the extended position to the folded position. Each tool bar section includes a latch and a wheel to secure the tool bar section to the central support bar. When folded, the latches are received upon the top of the central support bar and the wheels are retracted and abut a lower portion of the central support bar. The tool section can also flex with respect to the frame when traveling over uneven terrain.

19 Claims, 5 Drawing Sheets

U.S. PATENT DOCUMENTS

| | | |
|---|---|---|
| 3,983,944 | 10/1976 | Farrant . |
| 3,986,464 | 10/1976 | Uppiano . |
| 4,008,833 | 2/1977 | Gandrud et al. . |
| 4,023,623 | 5/1977 | Anderson . |
| 4,042,044 | 8/1977 | Honnold . |
| 4,050,523 | 9/1977 | Poland . |
| 4,058,170 | 11/1977 | Ankenman et al. . |
| 4,077,478 | 3/1978 | Neukom . |
| 4,088,346 | 5/1978 | Schreiner et al. . |
| 4,117,892 | 10/1978 | Dietrich, Sr. et al. . |
| 4,117,893 | 10/1978 | Kinzenbaw . |
| 4,126,187 | 11/1978 | Schreiner et al. . |
| 4,136,743 | 1/1979 | van der Lely . |
| 4,137,852 | 2/1979 | Pratt . |
| 4,138,134 | 2/1979 | Lechler et al. . |
| 4,150,724 | 4/1979 | Strobel . |
| 4,171,022 | 10/1979 | Applequist . |
| 4,172,537 | 10/1979 | Gandrud et al. . |
| 4,204,575 | 5/1980 | Richardson et al. . |
| 4,206,815 | 6/1980 | Hatcher . |
| 4,211,288 | 7/1980 | Applequist . |
| 4,214,634 | 7/1980 | Rau et al. . |
| 4,214,637 | 7/1980 | Applequist . |
| 4,236,585 | 12/1980 | Adee et al. . |
| 4,241,674 | 12/1980 | Mellinger . |
| 4,272,097 | 6/1981 | Cornelius . |
| 4,299,292 | 11/1981 | Hughes . |
| 4,306,732 | 12/1981 | Pettibone . |
| 4,319,643 | 3/1982 | Carter et al. . |
| 4,338,872 | 7/1982 | Decker . |
| 4,355,689 | 10/1982 | Friggstad . |
| 4,360,067 | 11/1982 | Schaaf et al. . |
| 4,360,215 | 11/1982 | Nohl et al. . |
| 4,364,581 | 12/1982 | Shoup . |
| 4,402,367 | 9/1983 | Couser . |
| 4,425,857 | 1/1984 | Lienemann et al. . |
| 4,479,549 | 10/1984 | Fegley . |
| 4,479,554 | 10/1984 | Kueker . |
| 4,496,004 | 1/1985 | Frase et al. . |
| 4,502,546 | 3/1985 | Moos . |
| 4,504,076 | 3/1985 | Bedney . |
| 4,506,609 | 3/1985 | Fuss et al. . |
| 4,518,046 | 5/1985 | Rettig et al. . |
| 4,519,460 | 5/1985 | Gust . |
| 4,576,238 | 5/1986 | Spencer . |
| 4,596,290 | 6/1986 | Bedney . |
| 4,607,709 | 8/1986 | Walser . |
| 4,660,651 | 4/1987 | Pfenninger et al. . |
| 4,664,202 | 5/1987 | Applequist et al. . |
| 4,721,168 | 1/1988 | Kinzenbaw . |
| 4,763,915 | 8/1988 | Risser . |

FOLDABLE IMPLEMENT CARRIER

BACKGROUND OF THE INVENTION

This invention relates to an improved foldable implement carrier having two tool sections which are pivotally connected to a central support member. The tool sections are movable from a working position, where they extend laterally outwardly from the central support member, to a folded position where they extend parallel to the central support member to reduce the width of the foldable implement carrier for transport.

Foldable implement carriers are known in the prior art which generally include a frame having a tool section pivotally attached to the frame and movable from a working position to a folded position to reduce the width of the implement carrier for transport. These prior art foldable implement carriers are unsatisfactory since the frame often supports the tool sections on separate frame elements resulting in a large frame, unnecessary weight and an implement carrier that is unnecessarily wide when folded. Further, the methods of mounting the tool section that are commonly used in the prior art limit the distance that each tool section can extend laterally outwardly from the frame in a working position. Thus, there continues to be a need for improved foldable implement carriers to meet the strict maximum widths that may be required for transport.

Other prior art foldable implement carriers must be pulled, or driven to cause folding. This is undesirable as it may require a large amount of space. Also, there are still other prior art foldable implement carriers that utilize relatively complex folding mechanisms, including guides and intricate working members.

Some foldable implement carriers utilize a telescopic central support bar to accommodate the folding of the tool sections. This is undesirable since it may result in a delicate connection that may not withstand stress and would thus be impractical.

The prior art also did not always adequately secure the tool sections when the foldable implement carrier was in a folded position. Thus, there may be undesirable movement of the tool sections with respect to the frame while the foldable implement carrier is being transported.

The prior art would sometimes include an arrangement to allow the tool sections to vertically flex with respect to each other as they encountered uneven terrain. However, the arrangements provided to achieve this goal were often quite complex. Additionally, these arrangements would often adversely effect the stability of the implement carriers when they were in a folded position.

SUMMARY OF THE INVENTION

The present invention discloses an improved foldable implement carrier in which tool sections are pivotally connected at fixed points on a single central support member which defines a central longitudinal axis. The tool sections are supported on the central support member, and portions of the tool sections cross the central support member when they are in a folded position. This results in a relatively narrow folded implement carrier while allowing the tool bar sections to extend laterally outwardly for a relatively great distance when in a working position. Also, the present construction ensures that the tool sections are securely held to the central support member.

In a disclosed embodiment, the foldable implement carrier is a grain drill having two tool bar sections with grain wheels and disks. However, it should be understood that foldable implement carriers having other types of tool sections are within the scope of this invention.

A relatively simple folding mechanism is disclosed which utilizes an H-shaped frame member having pivot columns that are secured to folding elements which are in turn secured to each tool section. A hydraulic cylinder rotates a respective folding element and pivot column on the H-shaped frame member, thereby driving the tool sections from the extended working position to the folded transport position.

Each folding element is connected to the tool section through a pair of flexible plate members that are pivotally connected to the tool section. This pivotal connection allows the tool sections to flex when traveling over uneven terrain. The flexible plate members provide a relatively simple connection, and in addition, allow the tool sections the freedom to flex while still retaining sufficient stability when in a folded transport position.

In a preferred embodiment, the tool sections, when folded, are secured to the central support member by a latch element which extends across an upper surface of the central support member and by an opposed retractable latching member located below the central support member. The opposed latching member is preferably an extensible and retractable wheel mounted at a laterally outer portion of the tool section and movable to a retracted position abutting the underside of the central support member. Each tool section includes a latch element and a movable support wheel for providing latching engagement with the central support member when the tool sections are folded. The tool sections are thus firmly held to the central support member when in the folded transport position.

In the disclosed embodiment, the latch element of each tool section is longitudinally spaced from its respective support wheel when the tool sections are folded. The stresses on the central support member associated with supporting and securing the two tool sections tend to be partially cancelled by the opposed positioning and longitudinal spacing between the latch elements and support wheels.

In moving the foldable implement carrier of this invention from an extended working position to a folded transport position, first hydraulic cylinders operate a set of main wheels which are located under the central support member while second and third slave hydraulic cylinders operate the respective support wheels that are associated with each of the tool sections. The main wheel set is pivoted to lift the central support member, and the second and third slave cylinders are simultaneously operated to raise the extended tool sections. Fourth and fifth hydraulic cylinders drive the folding elements to move the tool sections to the folded position. The tool sections can be folded while the remainder of the foldable implement carrier remains stationery.

When the tool sections initially reach the folded position, the latch means are spaced above the central support member and move across it. The second and third hydraulic cylinders are operated to retract the support wheels, thereby lowering the tool sections such that the latch elements abut the top of the central support member. The second and third hydraulic cylinders further retract the support wheels until they abut the vertically lower underside portion of the central support member. The two tool sections are then firmly held to the central support member.

The folded implement carrier of the present invention further includes an eraser assembly which is disposed behind the main wheel set and is in contact with the ground when the foldable implement carrier is in a working position. The eraser assembly erases ruts that may be caused by the main wheel set as it moves along ground that is being worked. When the main wheel set is pivoted to begin moving the foldable implement carrier to a folded position, the eraser assembly is automatically removed from the ground for transport.

These and other features and objects of the present invention can be best understood from the following specification and drawings, of which the following is a brief description.

DETAILED DESCRIPTION OF A PREFERRED EMBODIMENT

Figure 1:
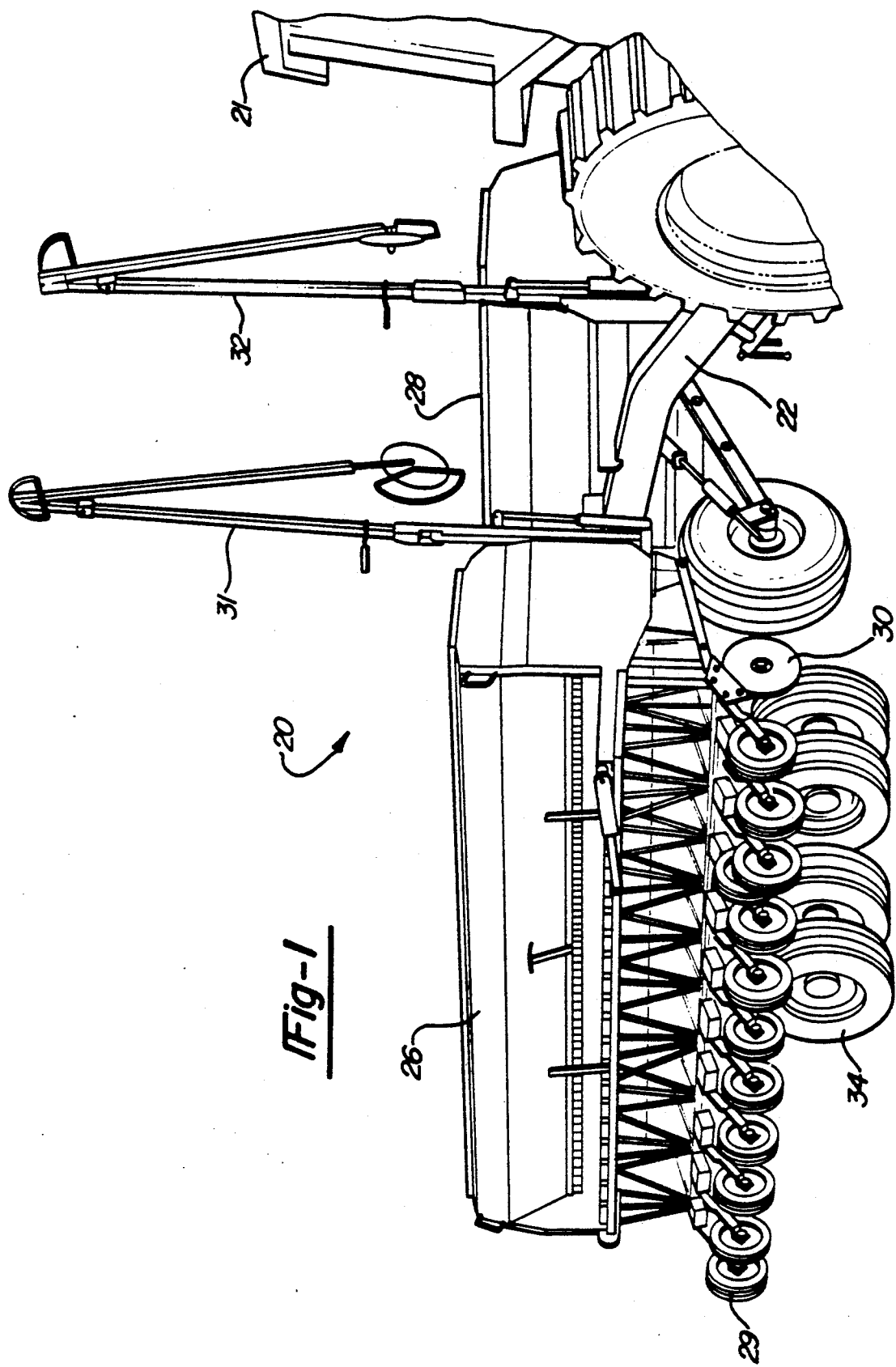
FIG. 1 is a side view showing a foldable implement carrier in a folded position.

Foldable implement carrier 20 is illustrated in FIG. 1 as a drain drill being drawn by vehicle 21, such as a tractor, through draft bar 22. Foldable implement carrier 20 includes first tool bar section 26 and second tool bar section 28, each of which includes a plurality of wheels 29, and disks 30. It is to be understood that foldable implement carrier 20 can be utilized to carry tool sections that employ other types of working tools; disks 30 and wheels 29 are shown by way of example only.

End of row markers 31 and 32 are associated with tool bar sections 26 and 28, respectively. Main wheel set 34 supports the entire foldable implement carrier 20 while in a folded position.

Figure 2:
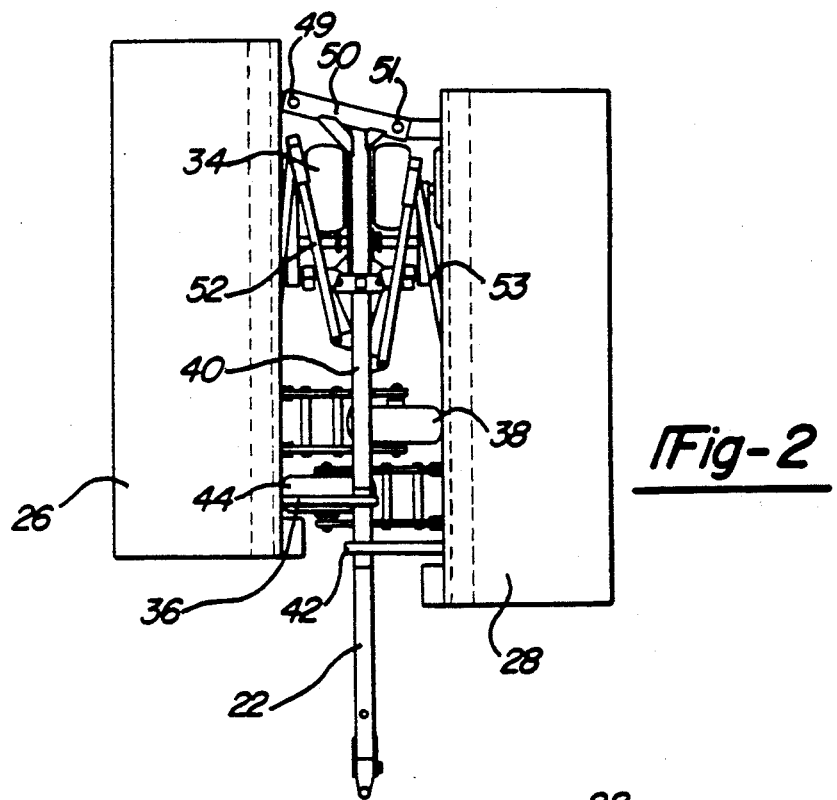
FIG. 2 is a top view showing the foldable implement carrier in a folded position.

Foldable implement carrier 20 is shown in a folded position in FIG. 2, with first tool bar section 26 having latch 36 and opposed support wheel 38 engaging central support bar 40. Central support bar 40 is connected to draft bar 22 and defines a central longitudinal axis for foldable implement carrier 20. Second tool bar section 28 has latch 42 and opposed support wheel 44, also engaging to central support bar 40. When the tool sections are folded, latches 36 and 42 and wheels 38 and 44 all extend across the central longitudinal axis defined by central support bar 40, providing greater stability.

Latch 36 is longitudinally spaced from support wheel 38, and latch 42 is longitudinally spaced from support wheel 44. The opposed positioning and longitudinal spacing of latches 36 and 42 and wheels 38 and 44 ensures that each tool bar section 26 and 28 is firmly secured to central support bar 40. In addition, the alignment of latch 36 and wheel 44, in combination with the opposed spacing of wheel 38 and latch 42 eliminates some stresses or moment arms that might be applied within central support bar 40 while supporting both tool bar sections 26 and 28.

First tool bar section 26 is pinned on pivot column 49 to laterally extending H-shaped member 50, which is fixed to central support bar 40. Second tool bar section 28 is pinned on pivot column 51 to H-shaped member 50 at a position longitudinally forward from the position of pivot column 49.

Figure 3:
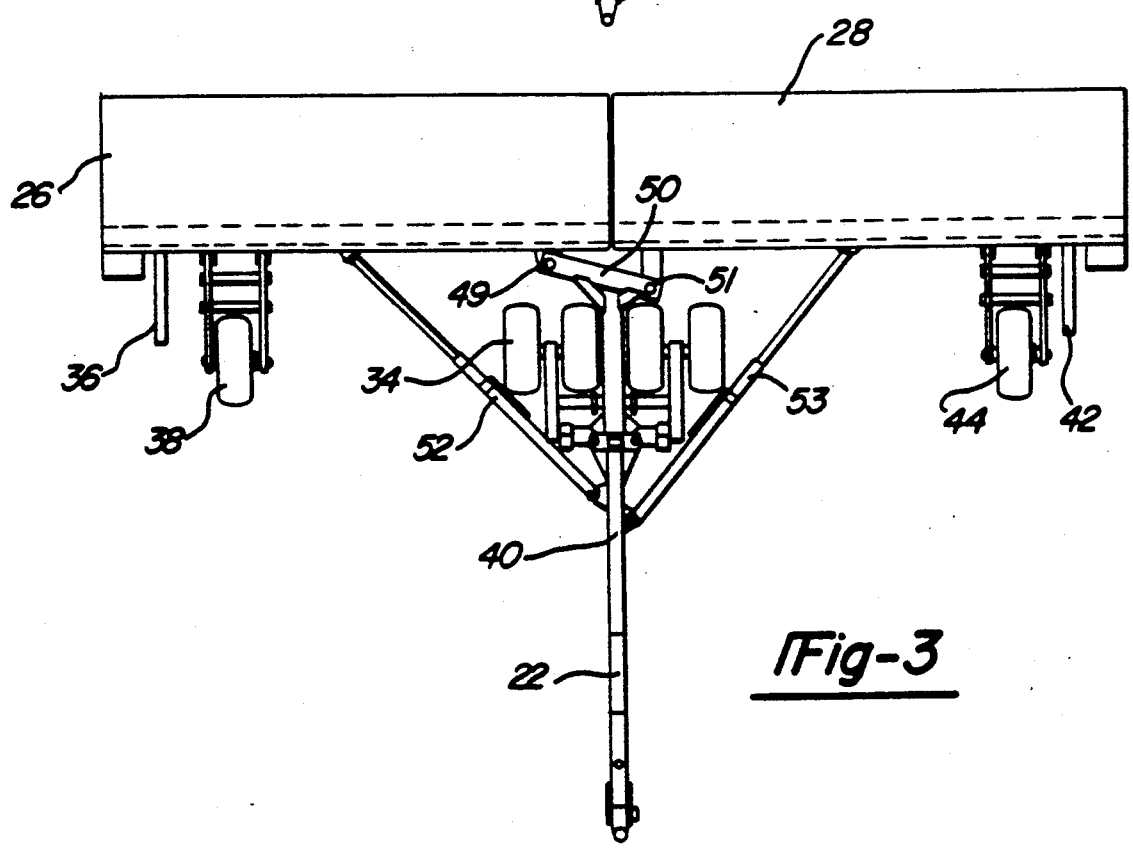
FIG. 3 is a top view showing the foldable implement carrier in an extended working position.

Foldable implement carrier 20 is shown in an extended working position in FIG. 3. First tool bar section 26 extends generally perpendicularly and laterally from the central longitudinal axis defined by central support bar 40. Second tool bar section 28 also extends generally perpendicularly and laterally from the longitudinal axis in a direction opposed to that of first tool bar section 26. H-shaped member 50 receives pivot columns 49 and 51, while folding tension tubes 52 and 53 hold tool bar sections 26 and 28 at their extended positions. Extensible and retractable support wheel 38 is at a laterally outward portion of first tool bar section 26 and extensible and retractable support wheel 44 is at a similar position on second tool bar section 28. While in this extended working position, foldable implement carrier 20 is pulled by vehicle 21 through draft bar 22 and is supported in a lowered working position by main wheel set 34 and wheels 38 and 44.

Figure 4:
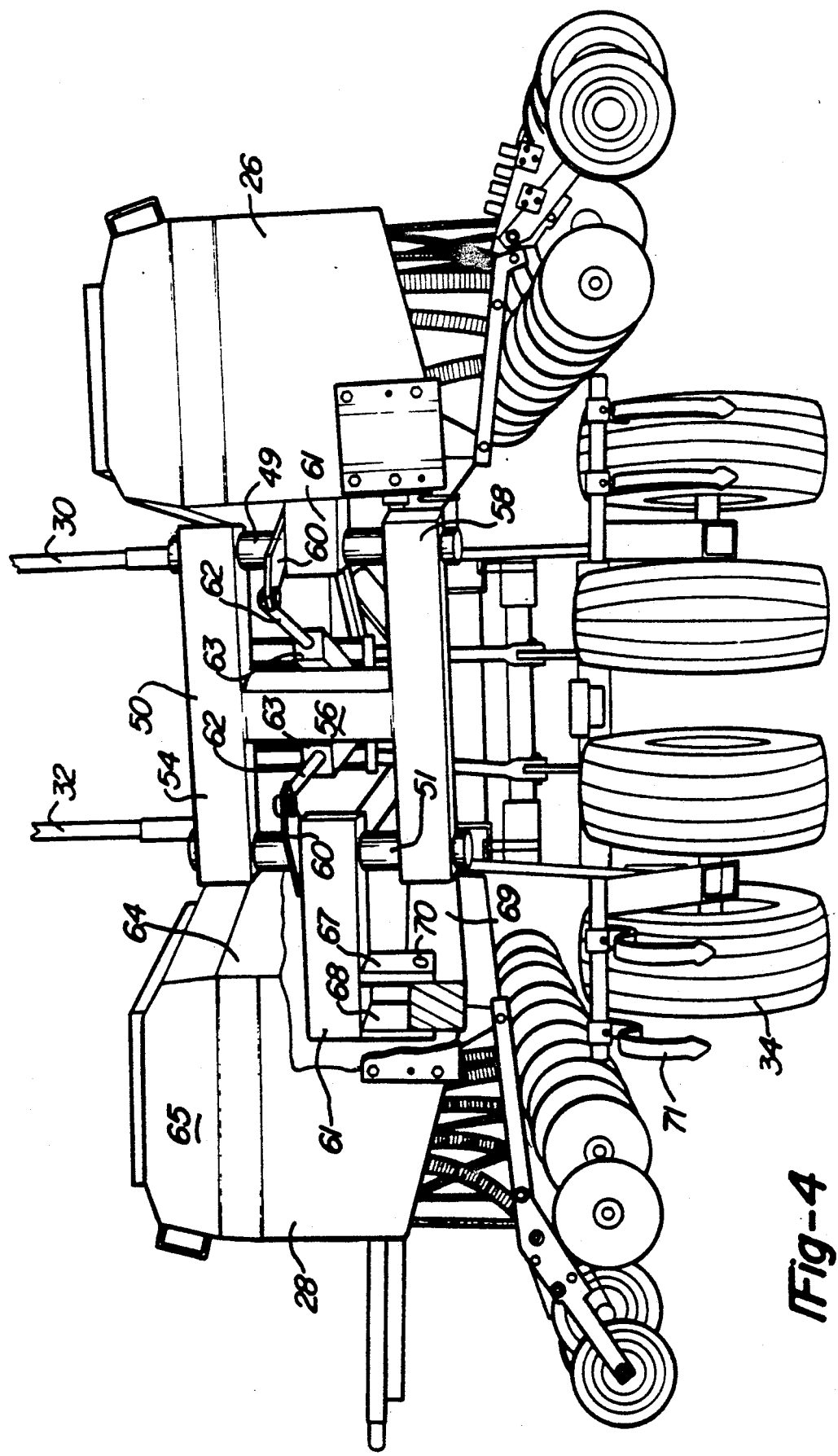
FIG. 4 is a rear view showing the foldable implement carrier in a folded position.

FIG. 4 illustrates details of the folding mechanism associated with foldable implement carrier 20. H-shaped member 50 includes upper bar 54, central extension 56 and lower bar 58. Central extension 56 provides rigidity to H-shaped member 50. Pivot columns 49 and 51 are rotatably received between upper bar 54 and lower bar 58. Folding plates 60 are connected to tool bar sections 26 and 28 by means of bar 61 which is also fixed to pivot columns 49 and 51. The connection of folding plates 60 to tool bar sections 26 and 28 is such that the tool bar sections may pivot about axes parallel to the central longitudinal axis when in the extended working position. This longitudinal pivoting allows the tool bar sections to flex with respect to the frame if the tool bar sections are traveling over uneven terrain. Details of the pivotal connection will be explained below. Folding pistons 62 are pivotally attached to each folding plate 60 and are powered by hydraulic cylinders 63. By selective actuation of hydraulic cylinders 63, folding pistons 62 can be moved to pivot folding plates 60 and pivot columns 49 and 51, to move tool bar sections 26 and 28 from the illustrated folded position to the extended position illustrated in FIG. 3.

Details of the pivotal connection of tool bar section 26 to bar 61 and folding plate 60 will be explained with reference to FIG. 4. An opening is provided in back wall 64 of the tool bar sections and bar 61 extends into the opening. Tool bar section 28 is shown with back wall 64 and side wall 65 partially cut-away. A downwardly extending flex plate 67 is fixed to bar 61 and a second flex plate 68 is positioned on the opposed side of a main beam 69 of tool bar section 26. Thus, main beam 69 is received between flex plates 67 and 68 and is pinned at 70 to plates 67 and 68. This connection allows tool bar section 28 to flex about pin 70 with respect to flex plates 67 and 68 as wheel 44 traverses uneven terrain. A similar arrangement is provided for tool bar section 26. The arrangements provided to allow flexing of tool bar sections 26 and 28 are relatively simple and in addition, the simplicity ensures the stability of tool bar sections 26 and 28 while they are in their folded transport position.

Eraser set 71 is at a position longitudinally rearward of main wheel set 34 and is in contact with the ground when foldable implement carrier 20 is in a working, extended position. Eraser set 71 may be mounted at a plurality of vertical positions relative to the frame of foldable implement carrier 20 and is pulled to remove ruts that main wheel set 34 may have caused.

Figure 5:
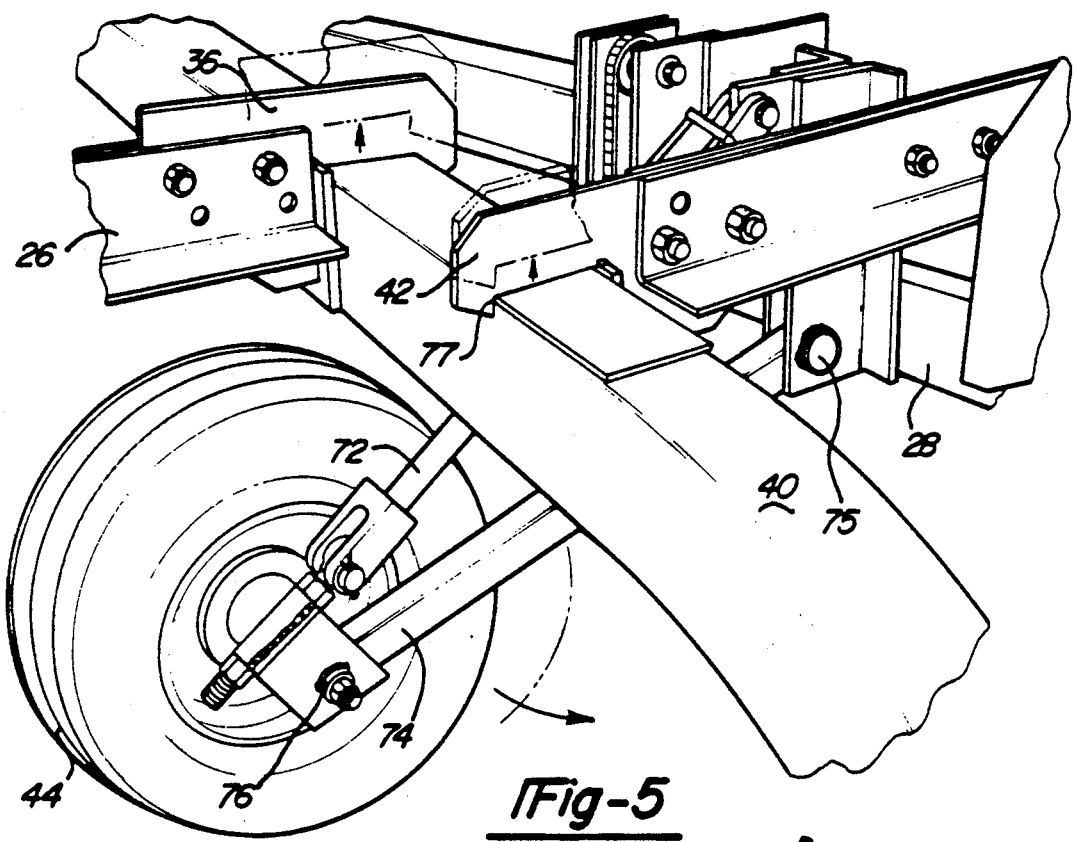
FIG. 5 is a partial enlarged view showing details of the present invention.

Details of the means to lock the tool bar sections 26 and 28 to the central support bar 40 are shown in FIG. 5. Wheel 44 is longitudinally aligned with latch 36. Latch 42 is spaced longitudinally forwardly from latch 36 and aligned wheel 44.

Wheel extension cylinder 72 moves wheel 44 through pivoted wheel mount 74, which is pinned at 76 to wheel 44, and which pivots about pivot point 75 on the frame of tool bar section 28. When it is desired to secure tool bar section 28 to central bar support 40, wheel extension cylinder 72 is actuated to move latch 42 on tool bar section 28 to a position slightly above central support bar 40. Section 28 is then folded to the position shown in FIG. 5, and cylinder 72 is retracted such that tool bar section 28 moves downwardly, and a notch 77 on latch 42 locks onto central support bar 40. Wheel 44 is further retracted to move vertically upwardly until it contacts a lower surface of central support bar 40. Tool bar section 28 is thus secured to central support bar 40. A similar procedure is utilized for securing section 26 to support bar 40.

Figure 6:
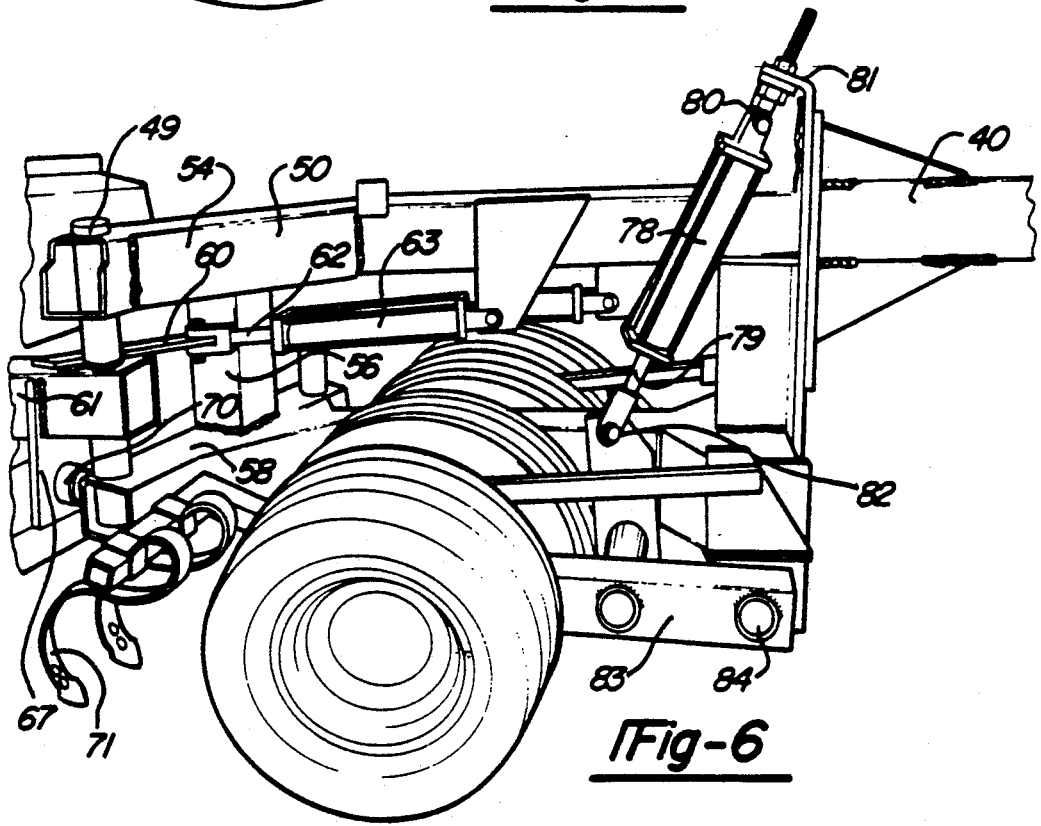
FIG. 6 is a partial enlarged view showing details of the present invention.

Details of the means for moving foldable implement carrier 20 from an extended position to a folded position are illustrated in FIG. 6. Hydraulic cylinder 78 has piston 79 pinned at 80 to cart frame 81, which along with central support bar 40 and H-shaped member 50 comprises a frame of foldable implement carrier 20. Piston 79 is pinned at 82 to wheel mount 83. Wheel mount 83 rotatably receives main wheel set 34, and it is pivotally pinned at 84 to a portion of cart frame 81. Preferably there are two hydraulic cylinders 78.

When it is desired to move foldable implement carrier 20 from an extended position to a folded position, hydraulic cylinders 78 are actuated, and pistons 79 force main wheel set 34 to pivot about pin 84 and move downwardly. Main wheel set 34 raises cart frame 81, central support 40 and H-shaped member 50 vertically upwardly as it pivots downwardly about pin 84. Slave cylinders 72 simultaneously move wheels 38 and 44 vertically downwardly to raise first and second tool bar sections 26 and 28.

Figure 7:
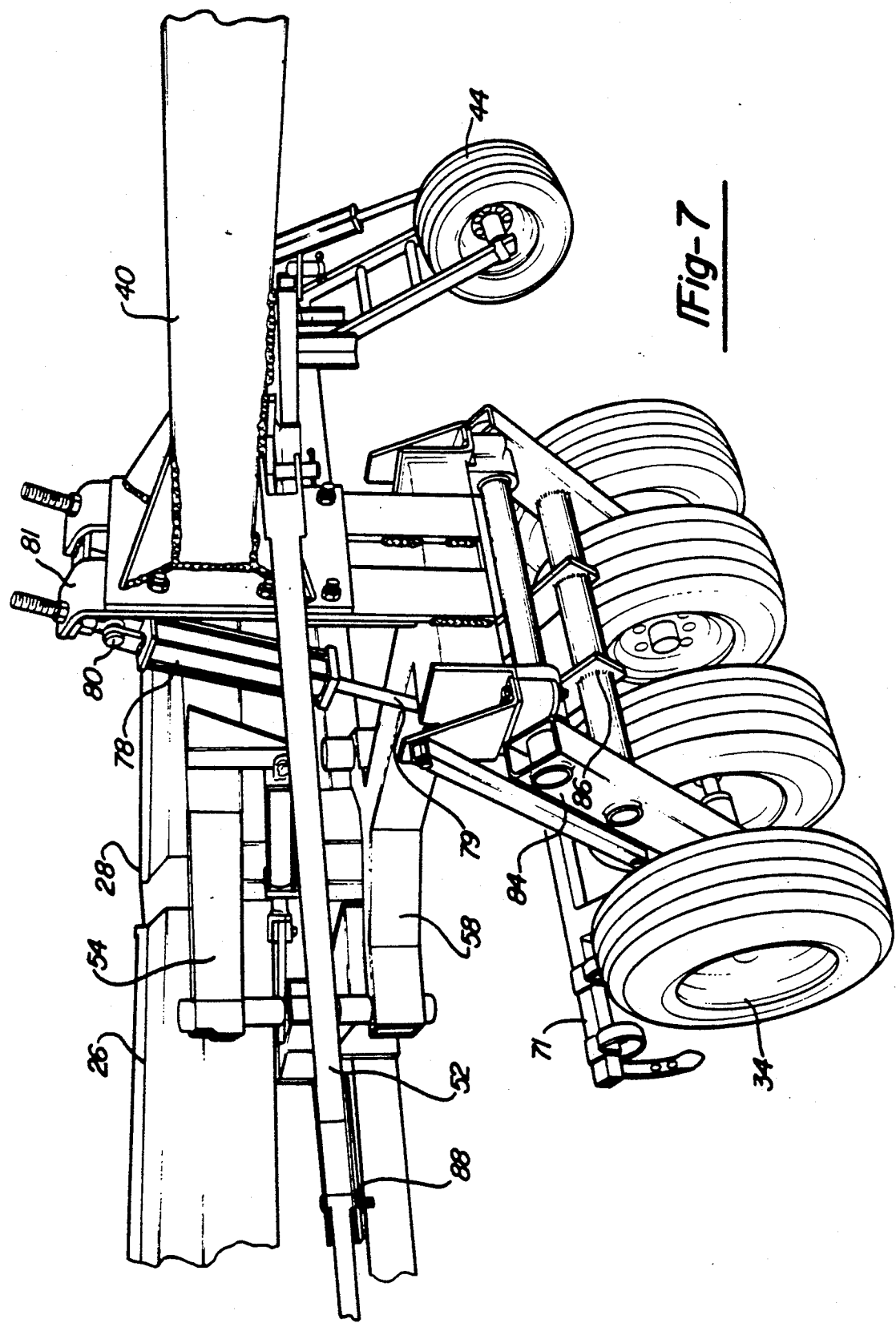
FIG. 7 is a view similar to FIG. 6, but showing the foldable implement carrier as it begins to move from a working position to a folded position.

As shown in FIG. 7, main wheel set 34 has moved vertically downwardly, and forced central support bar 40, and the remainder of foldable implement carrier 20 vertically upwardly. Bar 86 guides eraser assembly 71 to also move vertically upwardly.

Hydraulic cylinders 63 then extend folding pistons 62 to drive folding plates 60 and pivot columns 49 and 51 to bring tool bar sections 26 and 28 to the folded position. Wheels 38 and 44 remain extended downwardly while the tool bar sections 26 and 28 move from the extended position to the folded position. Foldable implement carrier 20 does not require any forward or rearward movement to permit this folding. Tension tubes 52 and 53 fold at point 88 to allow movement of tool bar sections 26 and 28 to the folded position.

When tool bar sections 26 and 28 have been folded, latches 36 and 42 are slightly spaced above central support bar 40. Once tool bar sections 26 and 28 have moved to the folded position, wheel extension cylinders 72 retract wheels 38 and 44, which vertically lowers latches 36 and 42 to place notches 77 onto central support bar 40. Wheel extension cylinders 72 continue to retract wheels 38 and 44 until they abut the bottom of central support bar 40. Cylinder safety stops may lock the hydraulic cylinders at this position during transport.

In order to move foldable implement carrier 20 from the folded position to an extended position, the cylinder safety stops are released. Wheel extension cylinders 72 then extend wheels 38 and 44 vertically downwardly until the wheels again come in contact with the ground, lifting first and second tool bar sections 26 and 28 slightly vertically upwardly and releasing notches 77 of latches 36 and 42 from central support bar 40. Folding cylinders 63 retract folding pistons 62 and cause first and second tool bar sections 26 and 28 to fold laterally outwardly about pivot columns 49 and 51 until they are at the extended position. Tension tubes 52 and 53 unfold at point 88 and retain tool bar sections 26 and 28 at the extended position.

The necessary controls for effecting the folding and unfolding are all preferably placed within the cab of a vehicle, such as tractor 21. The necessary controls and hydraulic circuitry are within the knowledge of a worker skilled in the art.

A preferred embodiment of the present invention has been disclosed; however, it should be understood that certain modifications would be obvious to one of ordinary skill in the art. Thus, the following claims define the scope and content of the present invention.

We claim:

1. A foldable implement carrier comprising:
    a central support defining a central longitudinal axis;
    a first tool section pivotally connected at a first point on said central support, a second tool section pivotally connected at a second point on said central support, said first and second tool sections being movable between a first extended position at which they extend generally perpendicular to said central longitudinal axis, and a second folded position at which they extend generally parallel to said longitudinal axis and forwardly from said points, said first and second tool sections each having portions crossing said central longitudinal axis and being supported by said central support while in the second folded position; and
    each of said first and second tool sections have a latch in abutting contact with said central support when said first and second tool sections are in the second folded position, said latches both being received upon one surface of said central support and each of said first and second tool sections having an opposed latching member coming in abutting contact with an opposed surface of said central support when said first and second tool sections are in the second folded position, said latches and said opposed latching members on each of said tool sections crossing said central longitudinal axis when said tool sections are in the second folded position.

2. A foldable implement carrier as recited in claim 1 wherein said latches each have a portion received on said central support.

3. A foldable implement carrier as recited in claim 2, wherein said tool sections are opposed to each other at said second folded position, said opposed latching member of said second tool section being laterally aligned with said latch of said first tool section.

4. A foldable implement carrier as recited in claim 1, wherein said opposed latching members are wheels which are vertically movable from laterally outer portions of said first and second tool sections.

5. A foldable implement carrier as recited in claim 1, wherein said first and second points are distinct points defining distinct pivot axes, said distinct pivot axes being mounted in a pivot member extending generally laterally perpendicularly to said central longitudinal axis.

6. A foldable implement carrier as recited in claim 5, wherein said distinct pivot axes are on opposed sides of said central longitudinal axis.

7. A foldable implement carrier as recited in claim 5, wherein said pivot member includes an upper and a lower bar member with a central member extending between the two, each pivot axis being defined by a pivot column rotatably mounted within said upper and lower bar members.

8. A foldable implement carrier as recited in claim 7, wherein folding plates are fixed to each of said first and second too sections and said pivot columns.

9. A foldable implement carrier as recited in claim 8, wherein hydraulic cylinders rotate said folding plates and said pIvot columns within said upper and lower bar members to move said first and second tool sections from the first extended position to the second folded position.

10. A foldable implement carrier as recited in claim 1, wherein a main wheel set supports the foldable implement carrier and is pivotally connected to a cart frame which is fixed to said central support, a hydraulic cylinder being connected to said main wheel set to pivotally move it downwardly with respect to said cart frame and said central support, and force said central support vertically upwardly.

11. A foldable implement carrier as recited in claim 10, wherein eraser means are disposed longitudinally behind said main wheel set and are movable into contact with the ground when said first and second tool sections are in the first extended position, and are removed from the ground when said main wheel set has been moved vertically downwardly to force said central support vertically upwardly.

12. A foldable implement carrier as recited in claim 1, wherein foldable tension tubes are connected between said central support and each of said first and second tool sections, said tension tubes retaining said first and second tool sections at the first extended position.

13. A foldable implement carrier as recited in claim 1, wherein said tool sections are the tool bar sections of a grain drill.

14. A foldable implement carrier comprising:
a central support bar extending along a central longitudinal axis;
a first tool bar section pivotally connected at a first point on said central support bar at one lateral side of said longitudinal axis, a second tool bar section pivotally connected at a second point on said central support bar at the other lateral side of said longitudinal axis, said first and second tool bar sections being movable between a first extended position at which they extend generally perpendicularly to said longitudinal axis and a second folded position at which they extend generally parallel to said longitudinal axis, said first and second tool bar sections being supported on said central support bar;
each of said first and second tool bar sections having a latch in abutting contact with said central support bar when said first and second tool bar sections are in the second folded position;
said latches both being received upon a top surface of said central support bar and each of said first and second tool bar sections have an opposed latching member vertically below, and in abutting contact with said central support bar, when said first and second tool bar sections are in the second folded position;
said latches each having a notch received on said central support bar;
said tool bar sections being opposed to each other at said folded position, said opposed latching member of said second tool bar section being laterally aligned with said latch of said first tool bar section;
said opposed latching member of said first tool bar section being spaced longitudinally rearwardly from said aligned position of said first tool bar section latch, said latch of said second tool bar section being spaced longitudinally forwardly of said aligned position of said first tool bar section latch; and
said opposed latching members being wheels which are movable vertically from laterally outer portions of said first and second tool bar sections.

15. A method of folding a foldable implement carrier comprising a frame and two opposed tool sections pivotally attached to the frame, the tool sections each having a wheel at a laterally outer portion, a main wheel set supporting the frame, comprising the steps of:
(1) forcing the main wheel set and the wheels on each tool section vertically downwardly, thus forcing the frame and the tool sections vertically upwardly;
(2) pivoting the tool sections about pivot axes on the frame to move the tool sections to a folded position;
(3) raising the wheels at the end of the tool sections vertically off of the ground, thus lowering latch members which are mounted to the tool sections vertically downwardly onto an upper surface of the frame, and continuing to raise the wheels until they abut a lower surface of the frame.

16. A method as recited in claim 15, wherein the frame extends along a longitudinal axis with the tool sections extending generally parallel to the longitudinal axis when in the folded position, with the latch members crossing the longitudinal axis.

17. A foldable implement carrier comprising:
a central support defining a central longitudinal axis;
a first tool section pivotally connected at a first point on said central support, a second tool section pivotally connected at a second point on said central support, said first and second tool sections being movable between a first extended position at which they extend generally perpendicularly to said central longitudinal axis, and a second folded position at which they extend generally parallel to said longitudinal axis and forwardly from said points, said first and second tool sections each having portions crossing said central longitudinael axis and being supported by said central support while in the second folded position;

each of said first and second tool sections having a latch in abutting contact with said central support when said first and second tool sections are in the second folded position;

said latches both being received upon one surface of said central support and each of said first and second tool sections having an opposed latching member coming in abutting contact with said central support when said first and second tool sections are in the second folded position, said latches each having a portion received on said central support; and said tool sections are opposed to each other at said second folded position, said opposed latching member of said second tool section being laterally aligned with said latch of said first tool section.

18. A foldable implement carrier as recited in claim 17, wherein said opposed latching member of said first tool section is spaced longitudinally rearwardly from said aligned position of said first tool section latch, and said latch of said second tool section is spaced longitudinally forwardly of said aligned position of said first tool section latch.

19. A foldable implement carrier as recited in claim 18, wherein said opposed latching members are wheels which vertically movable from laterally outer portions of said first and second tool sections.

* * * * *

UNITED STATES PATENT AND TRADEMARK OFFICE
CERTIFICATE OF CORRECTION

PATENT NO. : 5,024,279
DATED : June 18, 1991
INVENTOR(S) : Warner et al.

It is certified that error appears in the above-identified patent and that said Letters Patent is hereby corrected as shown below:

In claim 19, column 10, line 14, the word --are-- should be inserted after the word "which"

Signed and Sealed this

Twelfth Day of January, 1993

Attest:

DOUGLAS B. COMER

*Attesting Officer*   Acting Commissioner of Patents and Trademarks